United States Patent
Trzmiel et al.

(10) Patent No.: US 6,833,779 B2
(45) Date of Patent: Dec. 21, 2004

(54) PROPORTIONAL SOLENOID VALVE, PREFERABLY PROPORTIONAL THROTTLE VALVE, ESPECIALLY FOR HIGH PRESSURE DIESEL PUMPS OF MOTOR VEHICLES

(75) Inventors: Alfred Trzmiel, Grafenberg (DE); Rolf Neuhaus, Lohr (DE); Friedrich Zapf, Karlstadt (DE)

(73) Assignee: Hydraulik-Ring GmbH, Nürtingen (DE)

( * ) Notice: Subject to any disclaimer, the term of this patent is extended or adjusted under 35 U.S.C. 154(b) by 0 days.

(21) Appl. No.: 10/249,514

(22) Filed: Apr. 16, 2003

(65) Prior Publication Data
US 2003/0218524 A1 Nov. 27, 2003

(30) Foreign Application Priority Data
Apr. 20, 2002 (DE) .......................... 102 17 625

(51) Int. Cl.$^7$ ............................. F16K 31/02; H01F 7/08
(52) U.S. Cl. .............. 335/220; 251/129.08; 251/129.15
(58) Field of Search ................ 335/220–265; 137/82, 907, 625.61, 625.62, 625.63, 625.64; 251/30.01, 30.02, 129.01, 129.15, 129.08, 129.16, 129.21

(56) References Cited

U.S. PATENT DOCUMENTS 3,808,571 A  *  4/1974  Gerry ........................ 335/253
6,047,718 A  *  4/2000  Konsky et al. ..... 251/129.15 X
6,313,726 B1 * 11/2001  Golovatai-Schmidt et al. .. 335/220

* cited by examiner

*Primary Examiner*—James R. Scott
(74) *Attorney, Agent, or Firm*—Gudrun E. Huckett

(57) ABSTRACT

A proportional solenoid valve for a high-pressure diesel pump of a motor vehicle has a housing and a solenoid with an armature movable in the housing. A bushing is provided, and a piston is arranged in the bushing. The armature acts on the piston for moving the piston in the bushing as a function of a current supply to the solenoid. At least one component is positioned between the bushing and the housing and is deformable in an axial direction of the piston so as to allow an exact adjustment of the position of the piston relative to the bushing.

29 Claims, 1 Drawing Sheet

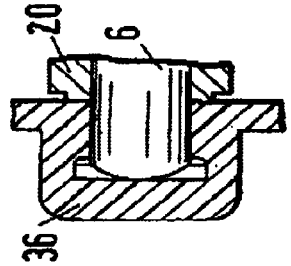
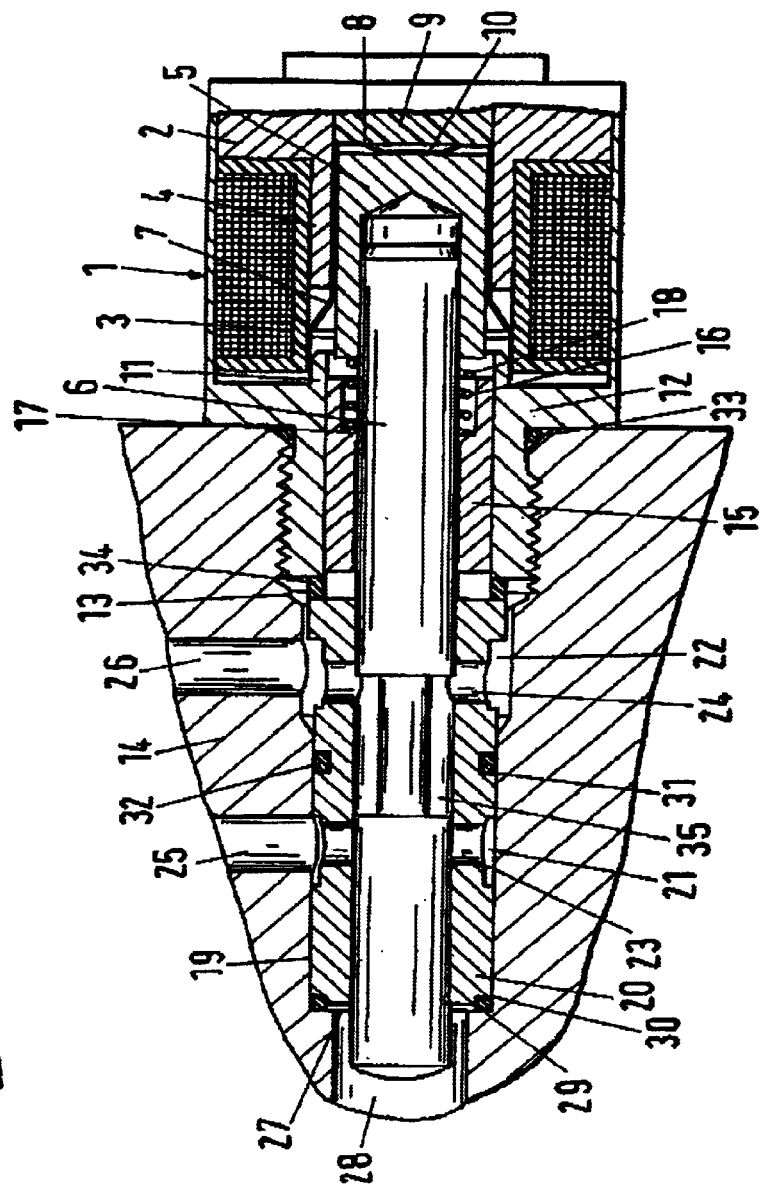

PROPORTIONAL SOLENOID VALVE, PREFERABLY PROPORTIONAL THROTTLE VALVE, ESPECIALLY FOR HIGH PRESSURE DIESEL PUMPS OF MOTOR VEHICLES

BACKGROUND OF INVENTION

1. Field of the Invention

The invention relates to a proportional solenoid valve, preferably a proportional throttle valve, especially for high-pressure diesel pumps of motor vehicles, comprising a solenoid with an armature that is movable within a housing and provided to move a piston in a bushing as a function of the supplied current.

2. Description of the Related Art

The piston of the proportional solenoid valve must be precisely adjusted so that a satisfactory throttling function is achieved. This adjustment is complex and difficult.

SUMMARY OF INVENTION

It is an object of the present invention to configure the proportional solenoid valve of the aforementioned kind such that the piston can be precisely positioned in a simple way relative to the bushing.

In accordance with the present invention, this is achieved in that between the bushing and the housing at least one component is positioned that is deformable in the axial direction of the piston.

In the proportional solenoid valve according to the invention the bushing is moved against the deformable component so that the bushing can be adjusted in a precise mounting position. During this adjusting process, the component is axially deformed in the axial direction of the bushing and of the piston arranged therein. In this way, the bushing can be moved in a very simple but precise way into the required mounting position.

In one embodiment according to the invention, the piston can be very precisely positioned in the exact mounting position by being pressed to the required extent into the armature. This provides for a highly precise positioning of the piston.

BRIEF DESCRIPTION OF DRAWINGS

FIG. 1 is an axial section of the throttle valve according to the invention.

FIG. 2 is a section view of a positional securing device of the piston of the throttle valve according to the invention.

DETAILED DESCRIPTION

The throttle valve is used advantageously in high-pressure diesel pumps of motor vehicles and is embodied as a proportional throttle valve. It comprises a proportional solenoid 1 with a housing 2 in which a coil 3 is arranged. The coil 3 surrounds a cup member 4 which is of a hood-shaped embodiment. An armature 5 projects into the cup member 4. The armature 5 is seated with press-fit on one end of a piston 6. The armature 5 is cup-shaped and projects with radial play into the cup member 4. A cup-shaped shielding member 7 is provided in the cup member 4 and has a bottom 8 resting on the bottom 9 of the cup member 4. The bottom 8 of the shielding member 7 is centrally provided with a raised portion 10 which is formed by a plastic deformation of the bottom 8. The armature 5 rests against the raised portion 10. The free end of the shielding member 7 overlaps a cylindrical projection 11 of a housing part 12 with which the proportional solenoid 1 is pressed into a receptacle 13 of a hydraulic component 14.

The piston 6 extends through a pole core 15 which is inserted into the housing part 12. The inner wall 16 of the pole core 15 is widened at its end facing the armature 5 so that a radial shoulder surface 17 is formed. The radial shoulder 17 supports one end of a pressure coil spring 18 whose other end is supported on the end face of the armature 5. By means of the pressure coil spring 18, the armature 5, and thus also the piston 6, is forced against the raised portion 10 of the bottom 8 of the shielding member 7 when the proportional solenoid 1 is not switched on.

The inner wall 19 of the receptacle 13 is reduced with respect to its diameter at a location spaced from the housing part 12. In this area, a bushing 20 rests against the inner wall 19 with its outer peripheral surface. In the bushing 20 the piston 6 is guided. The bushing 20 has at its outer peripheral surface two annular grooves 21, 22 positioned at an axial spacing from one another. Radial bores 23, 24 which are uniformly distributed about the circumference of the bushing 20 open into the grooves 21, 22 and penetrate the bushing 20. The hydraulic component 14 has two bores 25, 26 allowing flow of hydraulic medium. The bores 25, 26 can be opened and closed by means of the piston 6 in a way to be described in the following.

At the end facing away from the proportional solenoid 1, the inner wall 19 of the receptacle 13 passes by means of a radially inwardly oriented shoulder surface 27 into a central bore 28 having a diameter which is reduced relative to the receptacle 13. The free end of the piston 6 projects with radial play into this bore 28. The hydraulic bushing 20 rests against the shoulder 27 with interposition of an annular seal 29. The hydraulic bushing 20 is provided at its free end with an annular groove 30 that is open in a direction toward the end face, and the annular seal 29 is positioned in this groove 30.

The hydraulic bushing 20 is provided with annular groove 31 arranged in the area between the annular grooves 21, 22. This groove 31 receives an additional annular seal 32 resting sealingly against the inner wall 19 of the receptacle 13.

The receptacle 13 widens conically at the end facing the proportional valve 1. In this way, a receiving space for an annular seal 33 is formed with which the end face of the housing 2 of the proportional valve 1 is sealed relative to the hydraulic component 14.

The hydraulic bushing 20 has an axial spacing from the end face of the housing part 12. Between the end face of the hydraulic bushing 20 and the end face of the housing part 12 at least one component 34 is provided that is elastically or plastically deformable in the axial direction. The component 34 is preferably a gasket. By means of this deformable component 34, the hydraulic bushing 20 can be adjusted in a simple way into the required mounting position. By moving the bushing 20 against the component 34, a precise adjustment of the mounting position of the bushing 20 is ensured. Alternatively, or in addition, to this measure the piston 6 can be pressed into the armature 5 to different positions within the armature 5 allowing positional adjustment of the piston 6 in its exact mounting position. The adjustment of the solenoid force is realized by movement of the pole core 15 in the housing 2. The armature 5 is simply radially centered by means of the piston 6 in the bushing 20.

The piston 6 is provided with an annular groove 35.

The bushing 20 is inserted into the receptacle 13 of the hydraulic component 14 so that the bores 25, 26 can open into the annular grooves 21, 22. The piston 6 is pressed to such an extent into the armature 5 that the annular groove 21 and the radial bores 23 opening into it are closed by the piston 6 when the armature 5 rests under the force of the pressure spring 18 against the raised portion 10 of the bottom 8 of the shielding member 7 (FIG. 1). The annular groove 35 in the piston 6 has such a length that in this position the bore 26 of the hydraulic component 14 communicates via the radial bores 24 with the annular groove 35.

When the proportional solenoid 1 is excited, depending on the strength of the current that is supplied, the armature 5 is moved against the force of the pressure spring 18. When doing so, it entrains the piston 6. Already after a short movement path or stroke, the radial bores 23 are released by the piston 6 so that the hydraulic medium can flow from the bore 25 via the annular groove 35 into the bore 26. Depending on the movement path of the piston 6, the opening cross-section of the radial bores 23 can be adjusted continuously. The throttle effect can be adjusted in an optimal way. With a corresponding supply of current of the proportional solenoid 1, the armature 5 and thus the piston 6 can be moved to such an extent that the radial bores 24 are completely closed by means of the piston 6.

The piston 6 can be inexpensively manufactured, for example, from a bearing needle. The sealing rings 27, 32 on the bushing 20 ensure in a simple way a radial play compensation in the receptacle 13 of the hydraulic component 14. The proportional throttle valve is comprised only of a few components which can be positioned in the required mounting position as a function of the described configuration and arrangement.

Onto the end of the piston 6 projecting into the bore 28, a securing part 36 (FIG. 2) can be placed which serves as a transport securing device for preventing loss of the bushing 20 during transport. The securing part 36 is cup-shaped and is comprised advantageously of plastic material. It is seated on the piston end and provides a clamping action; it can be simply removed before mounting the solenoid 1 in the hydraulic component 14.

The deformable component 34 can be made of plastic material, rubber, or any other suitable deformable material. The proportional solenoid 1 can be simply screwed with the housing part 12 into the receptacle 13 so that a simple connection of the proportional solenoid 1 to the hydraulic bushing 20 is ensured.

While specific embodiments of the invention have been shown and described in detail to illustrate the inventive principles, it will be understood that the invention may be embodied otherwise without departing from such principles.

What is claimed is:

1. A proportional solenoid valve for a high-pressure diesel pump of a motor vehicle, the proportional solenoid valve comprising:
    a housing;
    a solenoid comprising an armature movable in the housing;
    a bushing;
    a piston arranged in the bushing;
    wherein the armature acts on the piston for moving the piston in the bushing as a function of a current supply to the solenoid;
    at least one component positioned between the bushing and the housing and deformable in an axial direction of the piston.

2. The solenoid valve according to claim 1, wherein the at least one component is elastically deformable.

3. The solenoid valve according to claim 1, wherein the at least one component is plastically deformable.

4. The solenoid valve according to claim 1, wherein the at least one component is a gasket.

5. The solenoid valve according to claim 1, wherein the at least one component rests against an end face of the bushing and an end face of the housing.

6. The solenoid valve according to claim 1, wherein the piston is adapted to be pressed into the armature to different positions within the armature allowing positional adjustment of the piston in an exact mounting position.

7. The solenoid valve according to claim 1, wherein the armature is supported by the piston in the bushing.

8. The solenoid valve according to claim 1, wherein the housing has a cup member and wherein the armature projects with radial play into the cup member.

9. The solenoid valve according to claim 1, wherein the armature is moved against a counter force when the solenoid is supplied with current.

10. The solenoid valve according to claim 9, further comprising a spring providing the counter force.

11. The solenoid valve according to claim 1, wherein the piston is made from a bearing needle.

12. The solenoid valve according to claim 1, wherein the bushing is adapted to be inserted into a receptacle of a hydraulic component, wherein the bushing has at least one sealing ring for play compensation when the bushing is seated in the receptacle.

13. The solenoid valve according to claim 1, wherein the solenoid has a pole core arranged movably in the housing for adjusting a magnetic force of the solenoid.

14. The solenoid valve according to claim 1, wherein the housing is adapted to be screwed into a receptacle of the hydraulic component.

15. The solenoid valve according to claim 1, further comprising a securing part functioning as a transport securing device placed onto a free end of the piston.

16. The solenoid valve according to claim 15, wherein the securing part is cup-shaped.

17. The solenoid valve according to claim 15, wherein the securing part is made of plastic material.

18. A proportional solenoid valve for a high-pressure diesel pump of a motor vehicle, the proportional solenoid valve comprising:
    a housing;
    a solenoid comprising an armature movable in the housing;
    a bushing;
    a piston arranged in the bushing;
    wherein the armature acts on the piston for moving the piston in the bushing as a function of a current supply to the solenoid;
    wherein the piston is adapted to be pressed into the armature to different positions within the armature allowing positional adjustment of the piston in an exact mounting position.

19. The solenoid valve according to claim 18, wherein the armature is supported by the piston in the bushing.

20. The solenoid valve according to claim 18, wherein the housing has a cup member and wherein the armature projects with radial play into the cup member.

21. The solenoid valve according to claim 18, wherein the armature is moved against a counter force when the solenoid is supplied with current.

22. The solenoid valve according to claim 21, further comprising a spring providing the counter force.

23. The solenoid valve according to claim 18, wherein the piston is made from a bearing needle.

24. The solenoid valve according to claim 18, wherein the bushing is adapted to be inserted into a receptacle of a hydraulic component, wherein the bushing has at least one sealing ring for play compensation when the bushing is seated in the receptacle.

25. The solenoid valve according to claim 18, wherein the solenoid has a pole core arranged movably in the housing for adjusting a magnetic force of the solenoid.

26. The solenoid valve according to claim 18, wherein the housing is adapted to be screwed into a receptacle of a hydraulic component.

27. The solenoid valve according to claim 18, further comprising a securing part functioning as a transport securing device placed onto a free end of the piston.

28. The solenoid valve according to claim 27, wherein the securing part is cup-shaped.

29. The solenoid valve according to claim 27, wherein the securing part is made of plastic material.

* * * * *